United States Patent [19]

Maue et al.

[11] Patent Number: 4,830,621
[45] Date of Patent: May 16, 1989

[54] SELECTIVE MULTICONNECTOR BLOCK

[75] Inventors: H. Winston Maue, Northville; Brian E. Henderson; Robert G. Szudarek, both of Warren; Thomas C. Wolanzyk, Brighton, all of Mich.

[73] Assignee: United Technologies Automotive, Inc., Dearborn, Mich.

[21] Appl. No.: 127,731

[22] Filed: Dec. 2, 1987

Related U.S. Application Data

[63] Continuation of Ser. No. 848,672, Apr. 4, 1986, abandoned.

[51] Int. Cl.4 .............................................. H01R 29/00
[52] U.S. Cl. ...................................... 439/52; 439/55; 439/652; 439/723
[58] Field of Search ...................................... 439/55–67, 439/76, 77, 121, 119, 43, 50–54, 629–639, 651, 723–725, 652, 653, 654

[56] References Cited

U.S. PATENT DOCUMENTS

| | | | |
|---|---|---|---|
| 3,697,927 | 10/1972 | Kunkle et al. | 339/19 |
| 3,710,285 | 1/1973 | Schor et al. | 339/147 P |
| 3,716,820 | 2/1973 | Deakin | 339/147 P |
| 3,753,212 | 8/1973 | Yamada et al. | 339/91 R |
| 3,917,371 | 11/1975 | Hirokawa et al. | 339/19 |
| 4,122,357 | 10/1978 | Sumida | 307/10 R |
| 4,179,179 | 12/1979 | Lowden | 339/186 M |
| 4,331,122 | 5/1982 | Sohner et al. | 439/651 |
| 4,385,791 | 5/1983 | Lovrenich | 339/156 R |
| 4,429,943 | 2/1984 | Inoue | 339/198 R |
| 4,464,003 | 8/1984 | Goodman et al. | 339/99 |
| 4,545,632 | 10/1985 | Maier et al. | 339/18 R |
| 4,588,239 | 5/1986 | Venaleck | 339/19 |
| 4,685,753 | 11/1987 | Isskiki et al. | 439/76 |
| 4,689,718 | 8/1987 | Maue et al. | 439/76 |

FOREIGN PATENT DOCUMENTS

| | | |
|---|---|---|
| 1151579 | 1/1964 | Fed. Rep. of Germany . |
| 1465084 | 1/1969 | Fed. Rep. of Germany . |
| 1765791 | 8/1971 | Fed. Rep. of Germany . |

Primary Examiner—David Pirlot
Attorney, Agent, or Firm—Lloyd D. Doigan

[57] ABSTRACT

A multiconnector block (19) for insertion between a junction block (4) and wire harness connectors (13), has a first array of terminals (24) to interconnect with the junction block (4), a second array of terminals (26) to interconnect with the connectors (13), and electrical connections among selective of the first and second arrays of terminals to provide required electrical circuitry.

4 Claims, 1 Drawing Sheet

SELECTIVE MULTICONNECTOR BLOCK

This application is a continuation of application Ser. No. 848,672 filed on Apr. 4, 1986, now abandoned.

TECHNICAL FIELD

This invention relates generally to automobile wiring and specifically to a multiconnector block.

BACKGROUND ART

Wire harnesses, which distribute electrical signals within an automobile, are generally nonstandard due to the varying range of options required for each automobile. For example, in Europe, there are several 17 different lighting configurations required (each country may require a unique configuration), each configuration being operated by the same controls. Separate harnessing is required for each different configuration to ensure that the controls operate the required light configuration.

Additionally, each option may require distribution of electrical signals and possibly, the feedback thereof, through different circuitry and different harnesses, thereby giving rise to nonstandard harnessing. For instance, harnesses, carrying signals requiring additional electrical elements to properly operated each option, are particularly difficult to standardize because the additional elements are hard wired into the harness making that harness relatively useless for other options. Even if wire harnesses were standardized, an automotive wiring system would require the flexibility to distribute control signals from and to those harnesses to accommodate required options.

The prior art has not provided the flexibility needed to allow wire harnesses to be standardized, generally showing a bus bar distributing signals by connecting two circuits. U.S. Pat. No. 3,697,927 to Kunkle et al., discloses wire harness connectors and a connector block with limited flexibility provided by a bus bar (38) appearing to connect two circuits. The bus bar does not provide for sufficient flexibility in the block to allow for the connection of discrete circuits corresponding to particular options. U.S. Pat. No. 3,917,371 to Hirokawa et al., discloses a simplified connection between circuits provided by a simplistic bus bar. Again, the device does not have the flexibility to allow for standardization with wire harnesses, merely, connecting single wires.

Accordingly, what is needed in the art is a multiconnector block between a junction block and wire harness connectors that allows for sufficient flexibility to accommodate vehicle motions and to allow for the standardization of wire harnesses.

DISCLOSURE OF INVENTION

Therefore, it is an object of the invention to standardize the wiring in an automobile.

It is a further object of the invention to provide the standardized wiring of an automobile with sufficient flexibility to accommodate options that may be required for each automobile.

These and other objects are accomplished by a multiconnector block having a first array of terminals to interconnect the multiconnector block with standardized wire harness connectors and a second array of terminals to interconnect the multiconnector block with a junction block. Flexibility is provided by making electrical connections among selected of the terminals to create the electrical pathways required to accommodate the particular options in each vehicle.

BRIEF DESCRIPTION OF DRAWINGS

FIG. 2 is a bottom view of the junction block of FIG. 1; an

BEST MODE FOR CARRYING OUT THE INVENTION

Figure 1:
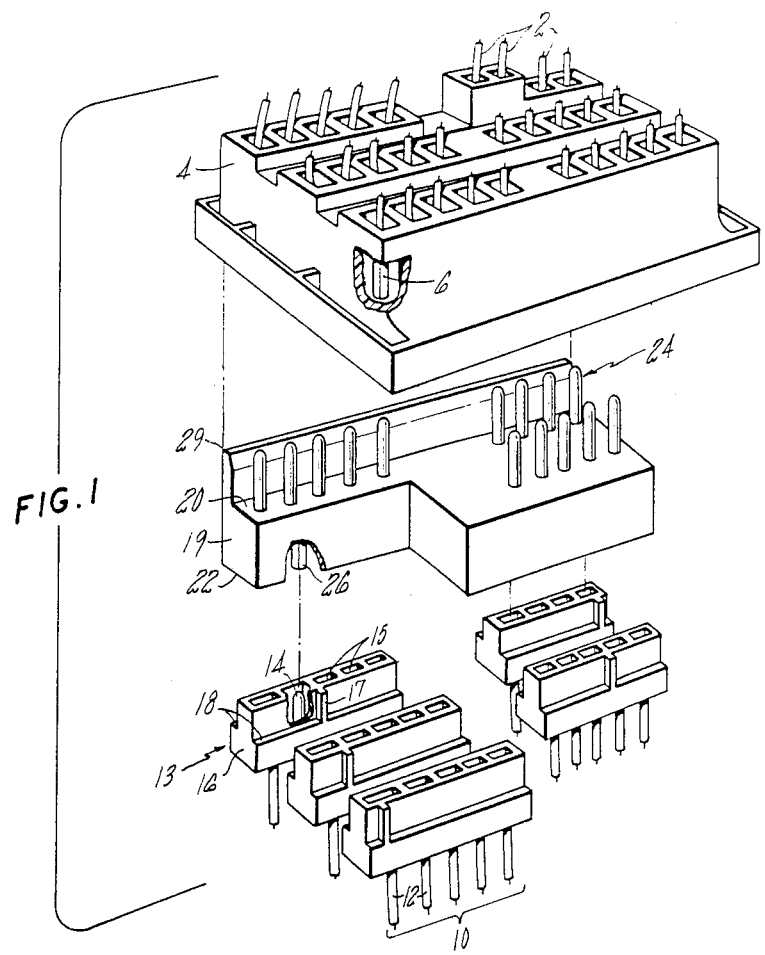
FIG. 1 is an exploded perspective view, partly broken away, of the multiconnector block of this invention shown between harness connectors and a junction block.
Figure 2:
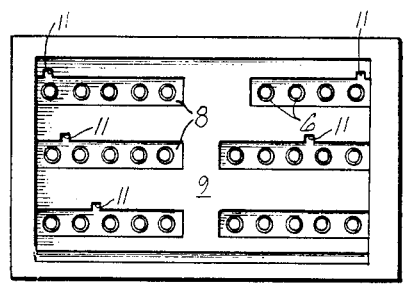

Referring to FIG. 1, a plurality of wires 2, providing electrical signals from controls (not shown) for the operation of a motor vehicle's options, terminate in an automotive junction block 4. Each wire 2 terminates in a female receptacle 6, the receptacles forming related arrays 8 that are recessed into a bottom 9 of the junction block (see FIG. 2). Each array has a polarizing notch extending therefrom into the block 4, as will be discussed infra.

Wire harnesses 10 have wires 12, corresponding in number to a full range of motions that a harness may accommodate, terminating in connectors 13. Connectors 13 have a roughly rectangular body portion 16 sized to fit within the recess array 8. Wire harness connectors have orifices 15 housing male plugs 14 that are inserted into female receptacles 6 in the junction block 4. Shoulder portions 18 protrude from either side of the body portion 16 to abut with bottom 9 of the junction block when the body portion is inserted into the recessed arrays, thereby preventing the connectors from being over inserted into those recessed arrays. A polarizing rib 17 extends along a side of body portion 16 in a direction of insertion of the body portion into array 8. The rib 17 mates with notch 11 to ensure that the proper connection 13 is inserted in the proper array 8. Electrical signals are transferred generally among the wires 2 terminating in the junction block and the wires 12 terminating in each related wire harness connector 13, as will be discussed infra. If the full range of vehicle options are not employed, several wires in each wire harness may not be used. The cost of extra wiring in each harness is offset by savings shown by the standardization of the harness.

If there is a one-to-one correspondence between the wires 2 terminating in the junction block 4 and the wires 12 terminating in a wire harness connector 13 in relation to required vehicle options, that wire harness may be plugged directly into the junction block. Similarly, if there is no relationship between the wires, unnecessary harnesses may be eliminated. However, if there is some relationship but not a one-to-one relationship between the wires, i.e., a signal must be distributed among several wires or harnesses, or if an additional electrical element is required, a multiconnector block 19 is interposed between the junction block and the relevant wire harness connectors.

Figure 3:
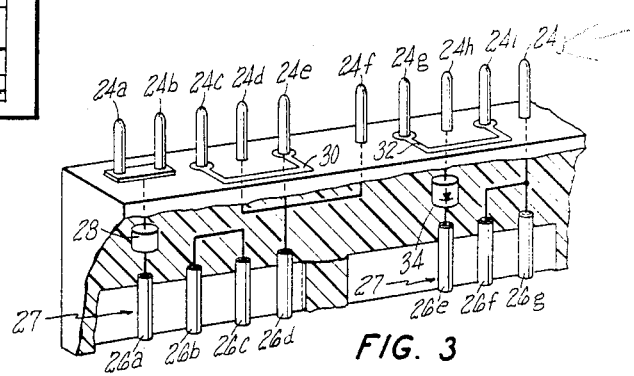
FIG. 3 is a perspective view, partly broken away, of the multiconnector block of FIG. 1.

The multiconnector block 19 is regularly shaped, having parallel major faces 20, 22. Top face 20 has a plurality of electrodes 24 (*a-j*) depending therefrom, and bottom face 22 has a plurality of female receptacles 26 (*a-g*) forming arrays 27. Electrodes 24 fit within the female receptacles 6 housed within the junction block, and the arrays 27 of female receptacles 26 receive the male plugs 14 housed in the wire harness connectors 13. Each array has a polarizing notch (not shown) similar to those in block 4 to ensure that the proper connector 13 is inserted into the proper array 27 in the multiconnector block. A polarizing flange 99 extends from a face of the block to properly locate the multiconnector block in relation to the junction block to ensure that the multiconnector block is properly aligned between the wire harness connectors and the junction block to create discrete circuits necessary for each option in each vehicle. The multiconnector block is constructed of an electrically insulative material, such as a plastic, to ensure that the circuits created among the multiconnector block, the junction block and the harness connectors are discrete. Electrical connection among wires 2 and 12, to create the discrete circuits necessary for each option is made among selected of the electrodes and/or selected of the female receptacles of the multiconnector block. One may readily appreciate that interconnections may be made in a variety of manners to create the circuitry required for each option. Interconnections may be made between electrodes and receptacles, or electrode and electrodes, or receptacles and receptacles. Electrical elements such as diodes, zener diodes, resistors, filters and the like may form connectors to give the selected circuitry the proper electrical characteristics. A variety of possible connections are disclosed (see FIG. 3): electrode 24a connects to electrode 24b and receptacle 26a by a resistor 28; electrode 24c connects to electrode 24e by a printed circuit conductor 30 and both connect to receptacle 26d; receptacle 26b connects to 26c; electrode 24d connects to electrode 24f; electrode 24g connects to 24i by a printed circuit conductor 32; electrode 24j connects to receptacles 26f and 26g; and electrode 24h connects to receptacle 26e by a diode 34. The electrical elements may be housed within the multiconnector block or may be disposed on the surface of the multiconnector block depending on the option required or method of construction used.

In operation, a multiconnector block corresponding to a vehicle's required options is interconnected to the junction block and the appropriate standardized harnesses are interconnected to the junction block and the multiconnector block, respectively. Assembly is then complete. Standardized harnesses may be use as the multiconnector block distributes the signals required for separate options previously carried by other separate harnesses. The inclusion of electrical elements in the multiconnector block further enhances standardization by allowing the harnesses to service a multiplicity of options because inclusion of the elements in the multiconnector block allows the harnesses to accommodate other options in other automobiles.

Accordingly, what is provided is an automobile multiconnector block, that provides the selected circuitry to accommodate particular vehicle options for each vehicle while allowing for the standardization of the wire harnesses within an automobile.

It should be understood that the invention is not limited to the particular embodiments shown and described herein, but that various changes and modifications ma be made without departing from the spirit and scope of the invention as defined by the following claims.

We claim:

1. A connector assembly for standardizing wiring within each of a plurality of automobiles, said connector assembly being characterized by:
   a standardized junction block for use in all of said automobiles said block having first terminals disposed therein, each terminal having a wire fixedly attached thereto said terminals being grouped into first arrays,
   a plurality of standardized wire harnesses for use in all of said automobiles, each said harness having a plurality of wires terminating in second terminals, said second terminals being disposed within a wire harness connector, each wire harness connector being adapted to align and mate with a particular first array so that respective of said first and second terminals may be electrically connected, and
   a single multiconnector block interposed between said junction block and said standardized wire harnesses such that each connector is aligned with said particular first array, said multiconnector block interconnecting said junction block and said plurality of wire harnesses in such a manner that each automobile may utilize said standardized junction block and said plurality of wire harnesses for any chosen vehicle options, said block having:
   a electrically insulating body,
   a plurality of third terminals attached to said body, said plurality of third terminals being grouped into second arrays, said second arrays aligning and electrically mating with selected of said particular first arrays depending on said options chosen,
   a plurality of fourth terminals attached to said body, said plurality of fourth terminals being grouped into third arrays, each of said third arrays mating with each said wire harness connector in alignment with said particular first arrays said particular first arrays being mated to a second array, and
   means electrically connecting selective of said third and fourth terminals attached to said body to establish discrete circuits among said terminals to accommodate said chosen range of vehicle options by connection of said wire harness connectors in plug positions identical to those which would otherwise directly connect said first and second terminals in the absence of the interposed interconnector block.

2. The apparatus of claim 1 wherein said electrically connecting means is characterized by a printed circuit.

3. The apparatus of claim 1 wherein said electrically connecting means is characterized by electrical elements.

4. The apparatus of claim 3 wherein said electrical elements are characterized by any of the group consisting of a diode, a zener diode, a resistor, a capacitor or a filter.

* * * * *